(12) United States Patent
An

(10) Patent No.: US 7,794,239 B2
(45) Date of Patent: Sep. 14, 2010

(54) MOBILE TERMINAL

(75) Inventor: Hyun Woo An, Seoul (KR)

(73) Assignee: Bluebird Soft Co., Ltd. (KR)

( * ) Notice: Subject to any disclaimer, the term of this patent is extended or adjusted under 35 U.S.C. 154(b) by 0 days.

(21) Appl. No.: 12/515,306

(22) PCT Filed: Nov. 2, 2007

(86) PCT No.: PCT/KR2007/005536

§ 371 (c)(1),
(2), (4) Date: May 18, 2009

(87) PCT Pub. No.: WO2008/060058

PCT Pub. Date: May 22, 2008

(65) Prior Publication Data

US 2009/0305580 A1 Dec. 10, 2009

(30) Foreign Application Priority Data

Nov. 17, 2006 (KR) .................. 10-2006-0113838

(51) Int. Cl.
*H01R 12/00* (2006.01)
(52) U.S. Cl. .................. 439/76.1; 439/587
(58) Field of Classification Search ............ 439/76.1, 439/587, 271, 589
See application file for complete search history.

(56) References Cited

U.S. PATENT DOCUMENTS 6,511,329 B2   1/2003  Yi-Tsung
7,118,646 B2 * 10/2006  Hunkeler ................. 156/293
7,413,445 B2 *  8/2008  Inagaki et al. ............ 439/76.1
7,419,385 B2 *  9/2008  Itou et al. ................ 439/76.1
7,520,758 B2 *  4/2009  Kim ...................... 439/76.1

FOREIGN PATENT DOCUMENTS

JP   02-250279    10/1990
JP   2004-048449   2/2004
WO   2005-048474   5/2005

OTHER PUBLICATIONS

International Search Report for PCT/KR2007/005536 dated Jan. 30, 2008.
Written Opinion for PCT/KR2007/005536 dated Jan. 30, 2008.

* cited by examiner

*Primary Examiner*—Gary F. Paumen
(74) *Attorney, Agent, or Firm*—Cantor Colburn LLP

(57) ABSTRACT

A mobile terminal includes a casing having an upper casing and a lower casing which are disassembled from and assembled to each other with respect to a main board, a connection terminal portion sealed with the casing to prevent intrusion of water through a gap between the connection terminal portion and the casing and having a plurality of connection terminals having one side exposed to the outside of the casing, and a joint terminal portion electrically connected to the main board and having a plurality of joint terminals respectively and electrically connected to the connection terminals in an elastically pressed state when the upper casing and the lower casing are assembled to each other.

11 Claims, 5 Drawing Sheets

[Figure 1]
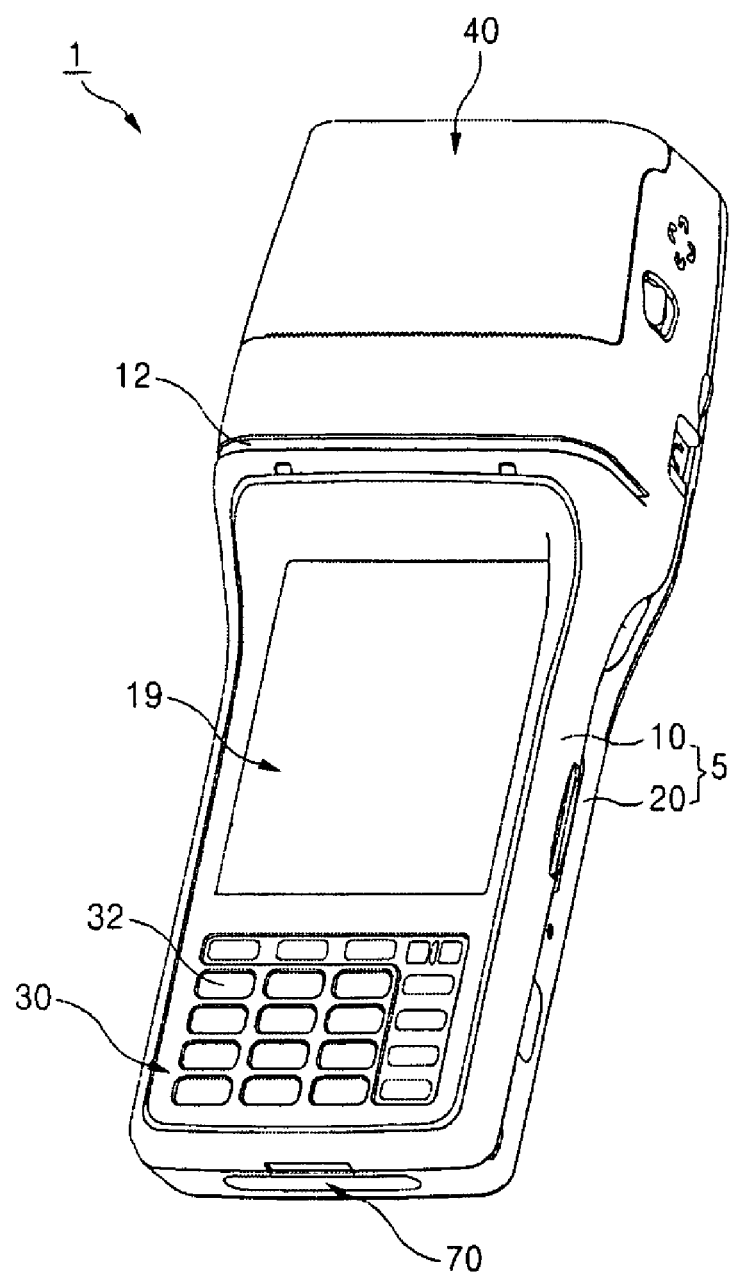

[Figure 2]
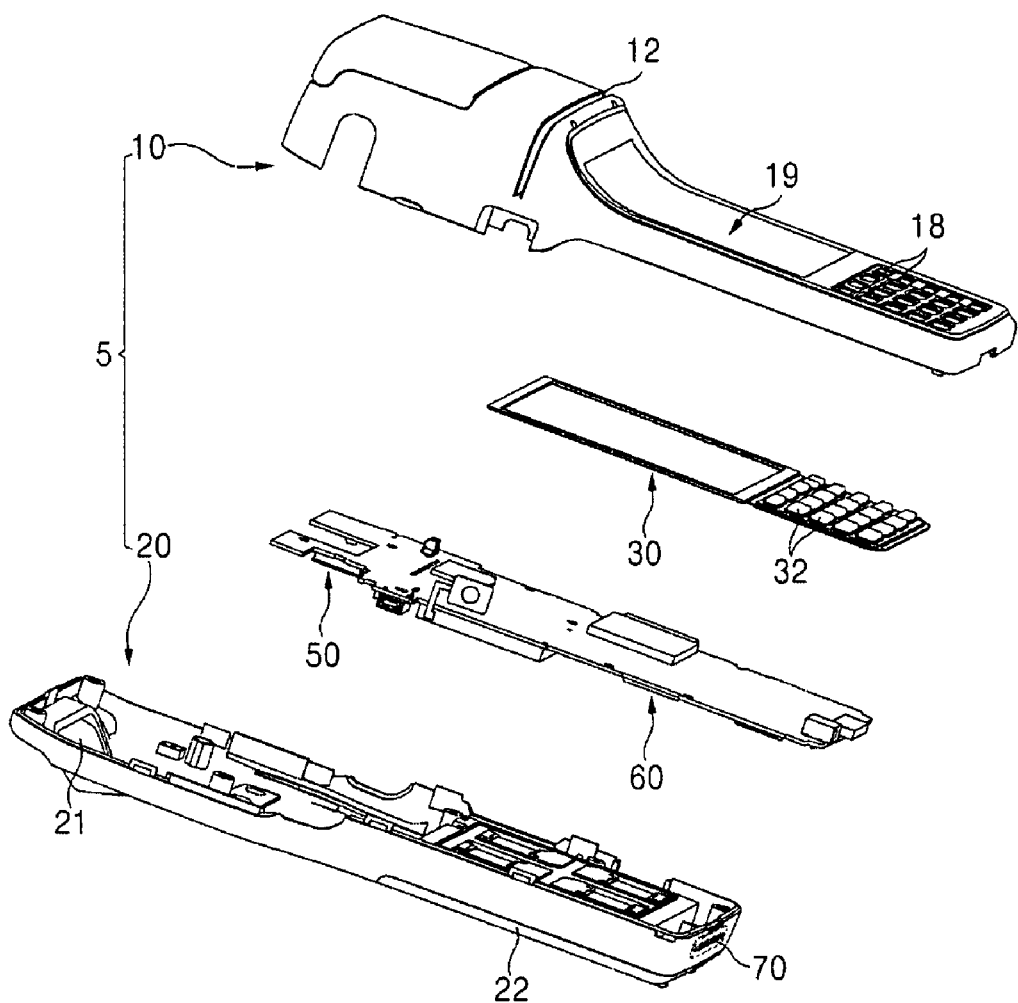

[Figure 3]
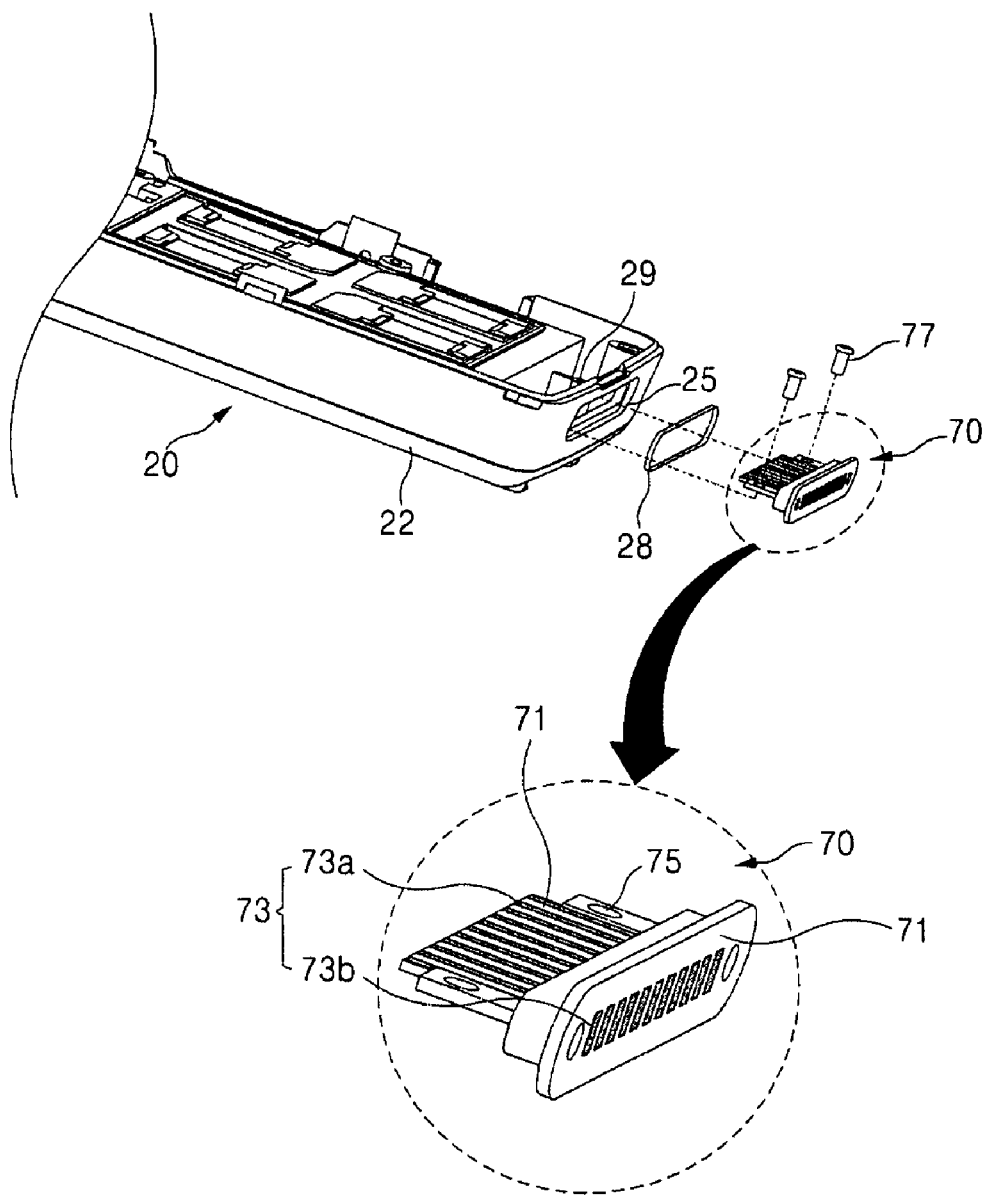

[Figure 4]
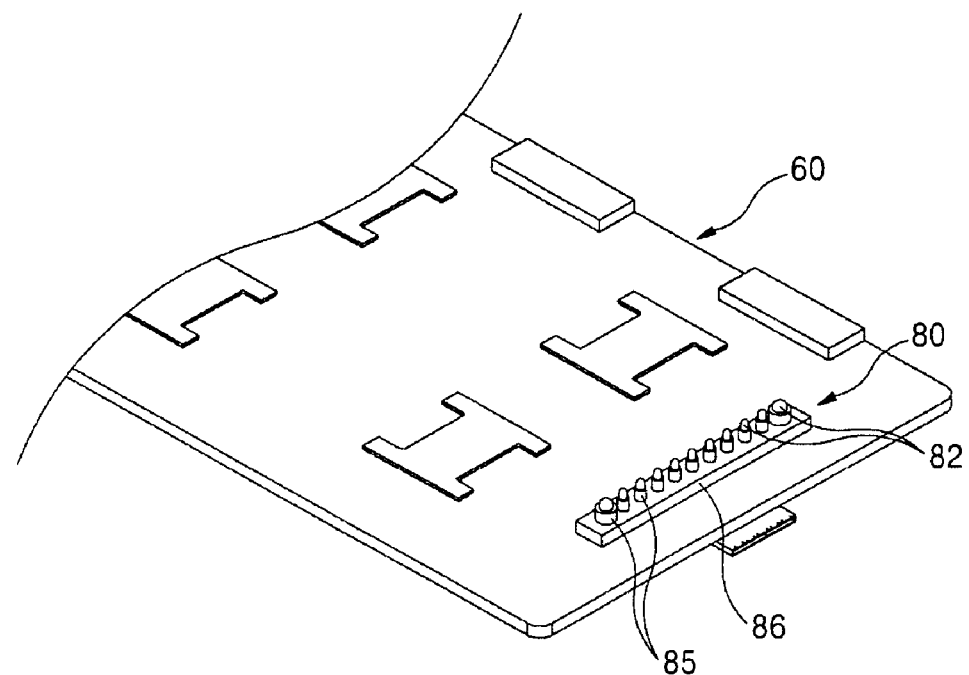
[Figure 5]
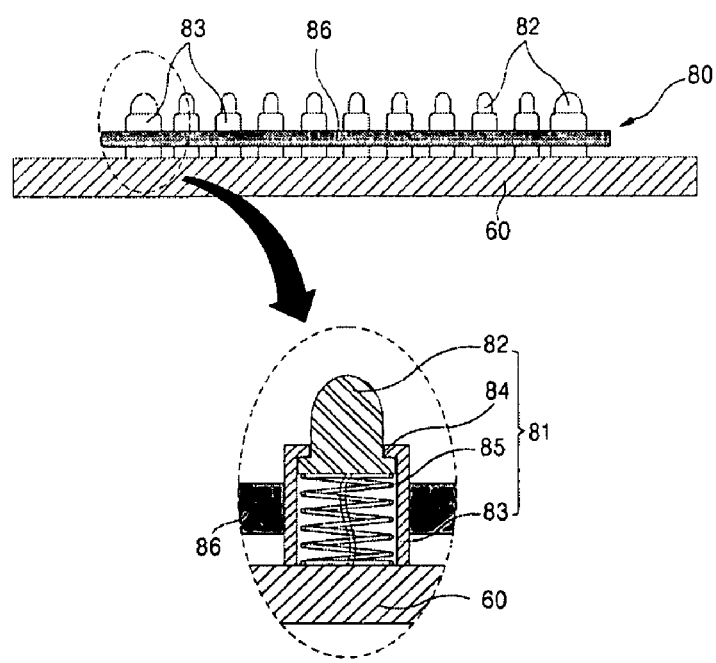

[Figure 6]
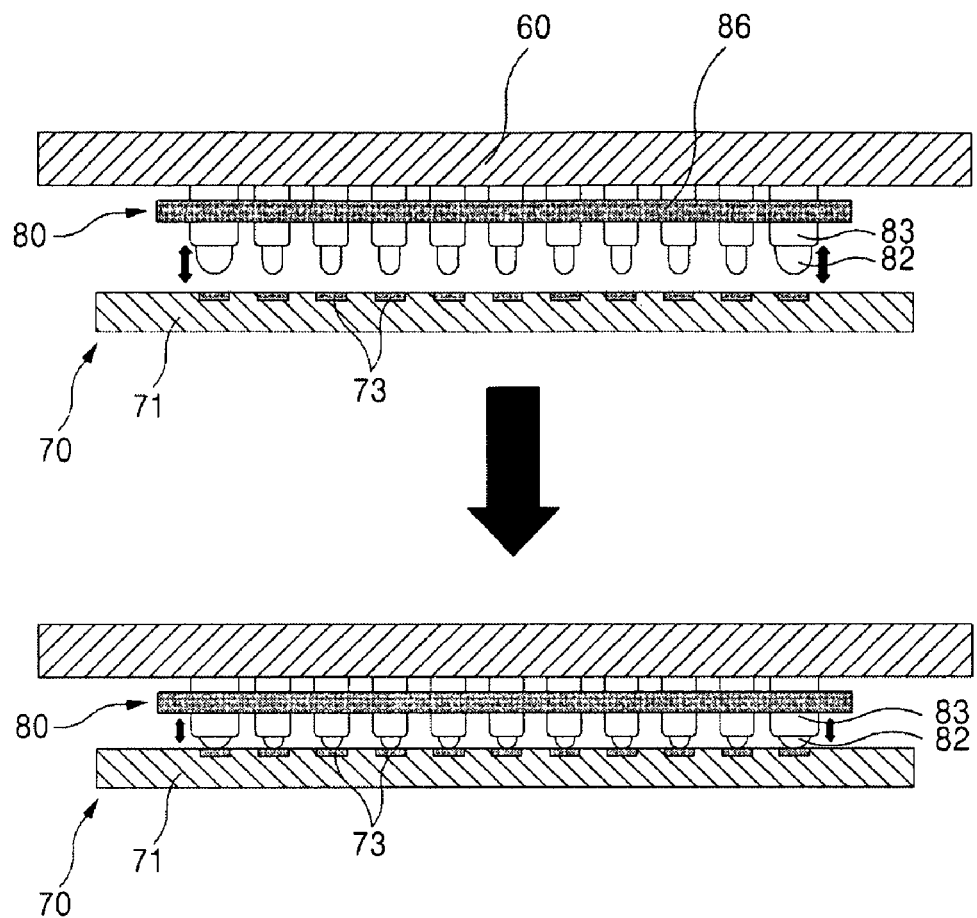

MOBILE TERMINAL

TECHNICAL FIELD

The present invention relates to a mobile terminal, and more particularly, to a mobile terminal in which the structure of a connection terminal portion electrically connected to an external device is improved to implement a waterproof function.

BACKGROUND ART

In general, mobile terminals can be freely used during moving without being limited by a place. Mobile communication terminals such as mobile phones and personal digital assistants (PDAs) called personal mobile terminals are typical mobile terminals. Thus, the term "mobile terminal" used in the present specification includes all the above devices. However, for the convenience of explanation, the following description focuses on the PDA.

In a complicated and diversified society, individuals need to store or maintain personal information. To meet such a need, various products are presently released in the market. One of the products is a PDA.

The PDA, called as a pocket computer, refers to all compact devices of a palm size having calculation and information storing and search functions for personal or business use. The PDA is widely used for schedule calendar and address information.

In particular, PDAs for industrial use are widely used especially in logistics industry and the market is gradually growing. The industrial PDA is equipped with various business functions as a barcode scanner and a card checker that is not provided in a general PDA. The industrial PDA has merits of efficient operations of delivery, file management, and related businesses.

For example, in insurance companies, various insurance related businesses such as customer information management, customer search, schedule management, interview records management, celebration data search, and fund account statement process can be directly processed by an insurance agent on the spot using the industrial PDA. In hospitals, not only treatment records, medical history, and prescriptions of a patient but also images such as an X-ray image and graphic materials can be input or searched for using the industrial PDA carried by medical staffs without limits in time and place. Also, in the business of police, the outside control business of traffic policemen and night guards is performed using the industrial PDA so that fines for violations of traffic regulations that must be paid 2-3 days after the issue of a fine can be instantly paid at financial institutes. Thus, time for the outside control business can be remarkably reduced.

Thus, as it can be seen that the industrial PDA is used in the above-described various industrial fields, the industrial PDA needs requirements over a predetermined level to endure in an industrial environment not in a general environment, unlike a general PDA. That is, when the industrial PDA is used in an industrial site, the industrial PDA can be used in a cold store at a temperature below −10° C. or outdoors for a long time. Also, since the industrial PDA can be toughly handled by a user such as a mailman, functions such as anti-shock, waterproof, and anti-heat/cold are needed for a competitive PDA.

In particular, since the industrial PDA is used in the industrial environment of a rather tough condition, a waterproof structure is required. Also, it may frequently occur that the industrial PDA bumps against a hard floor due to careless handling by a user. Accordingly, since various problems, for example, circuit parts in the industrial PDA may be deviated from the original positions or electric connection is cut off so that a battery cannot be charged, the industrial PDA must have an anti-shock function against a physical impact.

The industrial PDA has a connection terminal portion that is provided at a lower surface of a casing to connect to an external device such as a cradle. The connection terminal portion is electrically connected to a main board. Due to the above structure, the industrial PDA can charge a battery connected to the main board by receiving external power and also can transmit or receive data.

To implement a waterproof structure related to the connection terminal portion, intrusion of water into a gap of the connection terminal portion must be prevented. Nevertheless, the anti-shock function must not be degraded by the implementation of the waterproof structure.

However, in a conventional mobile terminal, since the connection terminal portion is manufactured in a complicated insertion type and connected to the external device, it is difficult to implement the waterproof structure. When the waterproof structure is implemented, it is a problem that the electric connection between the connection terminal portion and the external device is easily cut off due to degradation of the anti-shock function of the connection terminal portion, that is, an impact.

Thus, an improved structure to firmly maintain the electric connection between the connection terminal portion and the main board in spite of an impact and simultaneously implement a waterproof structure of the connection terminal portion is needed.

DISCLOSURE

Technical Problem

To solve the above and/or other problems, the present invention provides a mobile terminal which can not only prevent intrusion of water into a casing by making watertight a gap between the casing and the connection terminal portion electrically connected to an external device, but also maintain the electric connection between the connection terminal portion and the joint terminal portion coupled to the main board even when an excessive external impact is applied, so that functions such as battery charge and data transceiving can be smoothly performed.

ADVANTAGEOUS EFFECTS

According to the present invention, intrusion of water into a casing can be prevented by making watertight a gap between the casing and the connection terminal portion electrically connected to an external device. Also, the electric connection between the connection terminal portion and the joint terminal portion coupled to the main board is maintained even when an excessive external impact is applied. thus, functions such as battery charge and data transceiving can be smoothly performed.

DESCRIPTION OF DRAWINGS

FIG. 1 is a perspective view of a mobile terminal according to an embodiment of the present invention;

FIG. 2 is an exploded perspective view of the mobile terminal of FIG. 1;

FIG. 3 is a perspective view to explain the structure of the connection terminal portion coupled to the lower casing of FIG. 2;

FIG. 4 is a perspective view to explain the structure of the joint terminal portion coupled to the rear surface of the main board of FIG. 2;

FIG. 5 illustrates the structure of a POG pin of the joint terminal portion of FIG. 4; and FIG. 6 illustrates the joint between the connection terminal portion and the joint terminal portion in the mobile terminal of FIG. 2.

BEST MODE

According to an aspect of the present invention. a mobile terminal comprises a casing having an upper casing and a lower casing which are disassembled from and assembled to each other with respect to a main board, a connection terminal portion sealed with the casing to prevent intrusion of water through a gap between the connection terminal portion and the casing and having a plurality of connection terminals having one side exposed to the outside of the casing, and a joint terminal portion electrically connected to the main board and having a plurality of joint terminals respectively and electrically connected to the connection terminals in an elastically pressed state when the upper casing and the lower casing are assembled to each other.

The mobile terminal further comprises a sealing member coupled to the connection terminal portion and the casing between the connection terminal portion and the casing and sealing the gap between the connection terminal portion and the casing.

The sealing member is a double-side tape.

The connection terminal portion is coupled to an opening portion formed in a lower surface of the lower casing, and the connection terminal portion further comprises a terminal frame to which the connection terminals are coupled to allow the other side of each of the connection terminals is exposed toward the joint terminal portion.

The connection terminals are insert injection molded during the injection mold of the terminal frame and provided integrally with the terminal frame.

Surfaces of the connection terminals exposed to the outside of the casing are the same plane substantially parallel to a lower surface of the lower casing where the opening portion is formed, and surfaces of the connection terminals exposed toward the joint terminal portion are the same plane substantially parallel to an upper surface of the terminal frame.

The joint terminals are a plurality of POG pins and the joint terminal portion is coupled to the main board.

The joint terminal portion further comprises a pin support block formed of an insulation material integrally supporting the POG pins.

Each of the POG pins comprises a pin accommodation portion having one end coupled to the main board and the other end protruding from a surface of the main board in a vertical direction and having an exposure hole formed in an exposure end, a pin partially accommodated in the pin accommodation portion to allow one end to be externally exposed through the exposure hole, and an elastic member provided in the pin accommodation portion, having both ends arranged between the main board and the pin, and elastically biasing the pin in a direction in which the pin is exposed from the pin accommodation portion.

An escape prevention portion having an outer diameter greater than the inner diameter of the exposure hole to prevent the pin from escaping from the exposure hole is formed at an end portion of the pin contacting the elastic member.

The above mobile terminal is an industrial PDA.

MODE FOR INVENTION

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

The present invention can be diversely applied to a mobile terminal such as personal digital assistants, PDAs, including PDAs for industrial use and personal use regardless of whether they are of a flip type or a folder type. In the following description, an industrial PDA of a flip type will be mainly described.

FIG. 1 is a perspective view of a mobile terminal according to an embodiment of the present invention. FIG. 2 is an exploded perspective view of the mobile terminal of FIG. 1. FIG. 3 is a perspective view to explain the structure of the connection terminal portion coupled to the lower casing of FIG. 2. FIG. 4 is a perspective view to explain the structure of the joint terminal portion coupled to the rear surface of the main board of FIG. 2. FIG. 5 illustrates the structure of a POG pin of the joint terminal portion of FIG. 4. FIG. 6 illustrates the joint between the connection terminal portion and the joint terminal portion in the mobile terminal of FIG. 2.

Referring to the above drawings, the mobile terminal according to the present embodiment, that is, an industrial PDA 1, includes a casing 5 having an upper casing 10 and a lower casing 20, a key pad 30, a printer portion 40 for outputting a predetermined transaction record, a barcode recognition portion 50 for recognizing a barcode attached on an item, a main board 60 installed in the casing 5 and having various circuit parts mounted thereon, a connection terminal portion 70 coupled to the lower casing 20 and having a plurality of connection terminals 73 provided on a surface thereof, and a joint terminal portion 80 having one end coupled to the main board 60 supported by an inner surface of the upper casing 10 and the other end having a POG pin 81 elastically connected to the connection terminal portion 70.

The casing 5 can be disassembled into the upper casing 10 and the lower casing 20. As the upper casing 10 and the lower casing 20 are coupled to each other, an accommodation space for accommodating electronic parts is formed. Since the casing 5 can be disassembled into the upper casing 10 and the lower casing 20 and the upper casing 10 and the lower casing 20 can be assembled into the casing 5, the main board 60 can be installed in the casing 5 or a maintenance and repair work of the circuit parts can be easily performed.

A guide 12 having a shape of a groove as wide as the thickness of a magnetic card (M/C) to allow the M/C can slide along the groove is formed on a front surface of the upper casing 10. The guide 12 is formed by a guide wall (not shown) formed on a rear surface of the upper casing 10.

The guide wall is used as a place where a magnetic stripe reader (MSR) head (not shown) is coupled using an MSR head bracket (not shown). An exposure hole (not shown) penetrates a side of the guide wall, that is, a side of the guide wall facing the guide 12. As the MSR head is partially inserted in the exposure hole, information of the M/C sliding along the guide 12 can be detected.

A button hole 18 for exposing a plurality of signal input button 32 formed on the key pad 30 is formed in a lower area of the front surface of the upper casing 10 with respect to the guide 12. An opening for a screen is formed in a predetermined area between the guide 12 and the button hole 18. A liquid crystal display (LCD) is provided in the opening for a screen and used as a display portion 19 for displaying input information or processing steps. In addition to the LCD, a plasma display panel (PDP) or an organic light emitting diode (OLED) can be used as the display portion 19.

The printer portion 40 is provided in an upper area of the front surface of the upper casing 10 with respect to the guide 12. The printer portion 40 outputs a predetermined transaction record onto a sheet of paper. Thus, the printer portion 40 outputs the content of use of the M/C or a receipt of an item recognized by the barcode recognition portion 50.

The lower casing 20 is coupled to the upper casing 10 to face each other to form the accommodation space for accommodating electronic parts with the upper casing 10.

An opening window for a barcode scanner (not shown) as the barcode recognition portion 50 is provided in the upper portion of the lower casing 20. The barcode scanner installed in the accommodation space can be implemented as a camera, emission of a light source such as an infrared ray, or a laser. To read a barcode of an item, the barcode scanner is installed such that one side surface thereof for reading the barcode faces the outside, that is, a window open at an end portion of the lower casing 20. A cover 21 in a predetermined color is installed at the open window of the lower casing 20.

A battery 22 electrically connected to the main board 60 to apply power thereto is detachably installed on the rear surface of the lower casing 20. Although it is not shown in the drawings or not assigned to a numerical reference, a plurality of coupling holes (not shown) for coupling a plurality of screws (not shown) are formed in a corner portion of the lower casing 20 for the coupling of the upper casing 10, the lower casing 20, and the main board 60 accommodated therebetween.

As briefly described in the above, the mobile terminal, that is, the industrial PDA 1, of the present embodiment is electrically connected to a cradle (not shown) to charge the battery 22 or transmits or receives data by connecting to an external device. For this purpose, the industrial PDA 1 includes the connection terminal portion 70 and the joint terminal portion 80. The connection terminal portion 70 includes a terminal frame 71 formed of an insulation material, a plurality of the connection terminals 73 arranged on the terminal frame 71 to transmit data or power input from the outside of the industrial PDA 1 to the joint terminal portion 80, and two through-holes 75 formed for screw coupling of the terminal frame 71 to the inner surface of the lower casing 20.

As shown in FIG. 3, a total of the eleven connection terminals 73 are coupled to the terminal frame 71. An insert injection method is used to couple the connection terminals 73 to the terminal frame 71 so that the connection terminals 73 can be delicately and integrally coupled to the terminal frame 71. Since each of the connection terminals 73 is manufactured of a metal material that is easily bent or damaged, if the connection terminals 73 are coupled to the terminal frame 71 using a mechanical method other than the insert injection method, not only delicate technique is needed, but also more work time than one using the insert injection method is needed. However, even when the connection terminals 73 are coupled to the terminal frame 71 using a method other than the insert injection method, if the same effect as that of molding using the insert injection method can be obtained, the other method can be employed.

As shown in FIG. 3, the surface of the connection terminal 73*b* exposed outside the lower casing 20 makes substantially the same plane as the lower surface of the lower casing 20 where an opening portion 25 is formed. The surface of the connection terminal 73*a* exposed to the joint terminal portion makes substantially the same plane as the upper surface of the terminal frame 71. since the connection terminal portion 70 in the present embodiment is connected to the joint terminal portion 80 in an elastically pressed state due to the above shape, power and data provided by an external device can be accurately supplied to the main board 60, which will be described in detail later.

The two through-holes 75 of the connection terminal portion 70 are formed at both ends of the inner side of the terminal frame 71 so that the terminal frame 71 is fixed in the lower casing 20. The through-holes 75 and the female screw portion 29 formed in the inner surface of the lower casing 20 are aligned and a screw 77 is coupled to the through-holes 75 and the female screw portion 29 so that the terminal frame 71 can be firmly supported in the casing 5.

However, when the connection terminal portion 70 is coupled to the lower casing 20 using the above-described method, that is, by coupling one end of the terminal frame 71 to the opening portion 25 of the lower casing 20 and screw-coupling the other end of the terminal frame 71, water cannot intrude into the connection terminal portion 70 itself, but a gap between the connection terminal portion 70 and the opening portion 25 may not be completely sealed. In particular, since liquid such as water can intrude into the gap between the terminal frame 71 and the opening portion 25 so as to deteriorate the functions of electronic parts or make the electronic parts in a malfunction state, a member that seals the gap is needed.

Thus, in the present embodiment, when the terminal frame 71 is inserted in the opening portion 25, a sealing member 28 for waterproof is attached between the terminal frame 71 and the opening portion 25. The sealing member 28 blocks the intrusion of external water or gas that may corrode the internal parts. In the present embodiment, the terminal frame 71 and the opening portion 25 are sealed using a double-side tape 28 that facilitates assembly. However, another adhesive such as a bond can be used instead.

The joint terminal portion 80 in a state of electrically connected to the main board 60 connects the connection terminals 73 of the connection terminal portion 70 to transmit and receive data or power with respect to the main board 60. The joint terminal portion 80 includes the eleven POG pins 81 coupled to the main board 60 to one-to-one correspond to the eleven connection terminals 73 of the connection terminal portion 70, and a pin support block 86 integrally supporting the eleven POG pins 81 on the main board 60.

Each of the POG pins 81 includes a pin accommodation portion 83 having one end coupled to the main board 60 and the other end in a hollow shape where an exposure hole 84 is formed, a pin 82 partially accommodated in the pin accommodation portion 83 to be exposed through the exposure hole 84 of the pin accommodation portion 83, and an elastic member 85 provided in the pin accommodation portion 83 between the main board 60 and the lower surface of the pin 82 and elastically biasing the pin 82 in a direction to expose the pin 82.

As described in detail in FIG. 5, the lower end area of the pin 82 contacting the elastic member 85 has an escape prevention portion (not shown) which has a diameter greater than that of the upper end area of the pin 82 to prevent the pin 82 from escaping from the exposure hole 84. The internal diameter of the pin accommodation portion 83 to correspond to the shape of the pin 82 almost matches the outer diameter of the lower end portion of the pin 82. The inner diameter of the exposure hole 84 of the pin accommodation portion 83 almost matches the outer diameter of the upper end portion of the pin 82.

Owing to the above structure, the pin 82 is pushed by the elastic force of the elastic member 85 in a direction toward the exposure hole 84 but not separated from the pin accommodation portion 83. Accordingly, since the pins 82 of the joint terminal portion 80 and the connection terminals 73 are strongly connected to one another, even if a strong impact is applied to the casing 5, a case of partial or complete discontinuation of electric connection can be prevented.

The POG pins 81 are linearly arranged on the main board 60 to respectively correspond to the connection terminals 73 of the connection terminal portion 70 coupled to the lower casing 20 when the lower casing 20 and the upper casing 10 are coupled to each other. However, in order to prevent the POG pin 81 from being disconnected from the main board 60 or the POG pin 81 from being distorted with respect to the main board 60 so that the neighboring POG pins 81 contact each other by an external impact, the pin support block 86 formed of an insulation material such as plastic is integrally coupled to the POG pins 81 to support the POG pins 81.

The connection between the connection terminals 73 of the connection terminal portion 70 configured as above and the POG pin 81 of the joint terminal portion 80 will be described below with reference to FIG. 6. Each POG pin 81 is one-to-one connected to each of the connection terminals 73. The pin 82 of the POG pin 81 enters into the inside of the pin accommodation portion 83 a predetermined distance by pressure generated during the connection between the pin 82 and the connection terminal portion 70. Accordingly, the elastic member 85 provided in the pin accommodation portion 83 is compressed so that, as an elastic force is accumulated as much as the elastic member 85 is compressed, the pin 82 is pushed in the opposite direction, that is, toward the connection terminal portion 70. However, since the connection terminals 73 are fixedly coupled to the terminal frame 71 and the terminal frame 71 is fixedly coupled to the lower casing 20, the pin 82 of the POG pin 81 can maintain the connection to the connection terminals 73 in a slightly compressed state.

As described above, since the eleven connection terminals 73 of the connection terminal portion 70 and the eleven POG pins 81 of the joint terminal portion 80 are firmly connected by the elastic force, even when a strong impact is applied to the outer surface of the casing 5 due to the carelessness by a user, the connection between the connection terminals 73 and the POG pin 81 can be maintained.

Since the connection terminal portion 70 is insert injection molded in a state in which the connection terminals 73 are imbedded in the terminal frame 71, water cannot intrude into the connection terminal portion 70 itself. Also, since the contact surface between the connection terminal portion 70 and the opening portion 25 formed in the lower portion of the lower casing 20 is sealed by using the sealing member 28, that is, the double-side tape 28, the intrusion of water into the connection terminal portion 70 itself and the gap between the connection terminal portion 70 and the opening portion 25 can be prevented.

The connection between the connection terminal portion 70 and the joint terminal portion 80 in the industrial PDA 1 configured as above and the operation of the industrial PDA 1 are described as follows.

The eleven connection terminals 73 are placed in a mold (not shown) and the terminal frame 71 is injection molded using synthetic resin so that the connection terminal portion 70 in which the terminal frame 71 and the connection terminals 73 are integrally combined is provided. The connection terminal portion 70 is inserted in the opening portion 25 formed in the lower portion of the lower casing 20. Then, the through-holes 75 formed in a corner portion of the inner surface of the connection terminal portion 70 and the female screw portion 29 provided in the inner surface of the lower casing 20 are aligned and screw-coupled to each other. The contact surface between the opening portion 25 of the lower casing 20 and the terminal frame 71 of the connection terminal portion 70 is sealed using the sealing member 28, that is, the double-side tape 28. Such a waterproof process can completely prevent the intrusion of water into the gap between the connection terminal portion 70 and the casing 5. Thus, the electronic parts included in the casing 5 can be prevented from being damaged by water.

Next, it is checked whether the main board 60 is appropriately supported by the upper casing 10 and the joint terminal portion 80 is appropriately coupled to the main board 60. That is, it is checked whether each POG pin 81 is accurately and electrically connected to the main board 60 and whether the eleven POG pins 81 are coupled to the pin support block 86 and supported on the main board 86 without shaking.

The upper casing 10 supporting the main board 86 to which the joint terminal portion 80 is coupled and the lower casing 20 to which the connection terminal portion 70 is fixed are coupled to each other. A screw through-hole (not shown) of the upper casing 10 and a screw portion (not shown) formed in the lower casing 20 are aligned and a screw (not shown) is coupled to the aligned screw through-hole and the screw portion so that the assembly of the industrial PDA 1 is completed.

As the screw is gradually tightened and the upper casing 10 and the lower casing 20 are closely tightened, the connection terminal portion 70 and the joint terminal portion 80 are closely connected in the casing 5. In detail, the eleven connection terminals 73 arranged in a direction parallel to the terminal frame 71 of the connection terminal portion 70 and the eleven POG pins 81 of the joint terminal portion 80 are one-to-one connected to one another. The pin 82 directly contacting each of the connection terminals 73 can maintain a close contact with the connection terminal 73 by the elastic force in a direction toward the exposure hole 84 generated by the elastic member 85 provided in the pin accommodation portion 83.

According to the present embodiment, the intrusion of water into the connection terminal portion 70 itself or the gap between the connection terminal portion 70 and the casing 5 can be prevented. Since the connection between the connection terminal portion 70 and the joint terminal portion 80 is strong by the elastic force of the elastic member 85 provided in the joint terminal portion 80, Even when an external impact to some degree is applied, the electric connection can be continuously maintained.

In the above-described embodiment, it is described that the number of the connection terminals arranged on the terminal frame is eleven. However, the number of the connection terminals can be greater than or less than eleven.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

According to the present invention, the intrusion of water into the casing can be prevented by making watertight a gap between the casing and the connection terminal portion electrically connected to an external device. Also, the electric connection between the connection terminal portion and the joint terminal portion coupled to the main board is maintained even when an excessive external impact is applied. Thus, functions such as battery charge and data transceiving can be smoothly performed.

The invention claimed is:

1. A mobile terminal comprising:
   a casing including an upper casing and a lower casing which are disassembled from and assembled to each other with respect to a main board;
   a connection terminal portion sealed with the casing to prevent intrusion of water through a gap between the connection terminal portion and the casing, and including a plurality of connection terminals including one side exposed to the outside of the casing; and
   a joint terminal portion electrically connected to the main board, and including a plurality of elastic joint terminals respectively and electrically connected to the connection terminals in an elastically pressed state when the upper casing and the lower casing are assembled to each other.

2. The mobile terminal of claim 1, further comprising a sealing member coupled to the connection terminal portion and the casing between the connection terminal portion and the casing and sealing the gap between the connection terminal portion and the casing.

3. The mobile terminal of claim 2, wherein the sealing member is a double-side tape.

4. The mobile terminal of claim 2, wherein the connection terminal portion is coupled to an opening portion formed in a lower surface of the lower casing, and the connection terminal portion further comprises a terminal frame to which the connection terminals are coupled to allow the other side of each of the connection terminals to be exposed toward the joint terminal portion.

5. The mobile terminal of claim 4, wherein the connection terminals are insert injection molded during injection molding of the terminal frame, and provided integrally with the terminal frame.

6. The mobile terminal of claim 4, wherein surfaces of the connection terminals exposed to the outside of the casing are on a same plane substantially parallel to the lower surface of the lower casing where the opening portion is formed, and surfaces of the connection terminals facing the joint terminal portion are on a same plane substantially parallel to an upper surface of the terminal frame.

7. The mobile terminal of claim 1, wherein the joint terminals are a plurality of POG pins and the joint terminal portion is coupled to the main board.

8. The mobile terminal of claim 7, wherein the joint terminal portion further comprises a pin support block formed of an insulation material integrally supporting the POG pins.

9. The mobile terminal of claim 7, wherein each of the POG pins comprises:
   a pin accommodation portion having one end coupled to the main board and the other end protruding from a surface of the main board in a vertical direction and having an exposure hole formed in an exposure end;
   a pin partially accommodated in the pin accommodation portion to allow one end to be externally exposed through the exposure hole; and
   an elastic member provided in the pin accommodation portion, having both ends arranged between the main board and the pin, and elastically biasing the pin in a direction in which the pin is exposed from the pin accommodation portion.

10. The mobile terminal of claim 9, wherein an escape prevention portion having an outer diameter greater than the inner diameter of the exposure hole to prevent the pin from escaping from the exposure hole is formed at an end portion of the pin contacting the elastic member.

11. The mobile terminal of claim 1, being an industrial PDA.

* * * * *